(12) United States Patent
Cavagna

(10) Patent No.: US 7,313,978 B2
(45) Date of Patent: Jan. 1, 2008

(54) LINEAR MOTION DEVICE ASSOCIATED TO A WORM

(76) Inventor: Elio Cavagna, P. za Piemonte, 5-20077 Melegnano Milan (IT)

( * ) Notice: Subject to any disclaimer, the term of this patent is extended or adjusted under 35 U.S.C. 154(b) by 372 days.

(21) Appl. No.: 10/637,921

(22) Filed: Aug. 8, 2003

(65) Prior Publication Data
US 2004/0134296 A1 Jul. 15, 2004

(30) Foreign Application Priority Data
Jan. 13, 2003 (IT) .......................... MI2003A0038

(51) Int. Cl.
*F16H 25/22* (2006.01)
(52) U.S. Cl. .................. 74/89.38; 74/424.78
(58) Field of Classification Search ............... 74/89.38, 74/424.78
See application file for complete search history.

(56) References Cited

U.S. PATENT DOCUMENTS

| | | | | |
|---|---|---|---|---|
| 1,340,468 A | * | 5/1920 | Vaught | 74/424.78 |
| 1,721,227 A | * | 7/1929 | Manley | 254/100 |
| 2,141,726 A | * | 12/1938 | Schafer | 242/279 |
| 2,556,572 A | | 6/1951 | Brinkhurst | |
| 3,546,930 A | * | 12/1970 | Flarsheim | 74/424.9 |
| 4,717,978 A | * | 1/1988 | Ichinose | 360/267.8 |
| 4,918,783 A | * | 4/1990 | Chu | 16/19 |
| 4,977,788 A | | 12/1990 | Besemann | |
| 5,622,251 A | * | 4/1997 | Rantanen | 198/747 |

FOREIGN PATENT DOCUMENTS

| | | |
|---|---|---|
| DE | 38 07 730 A1 | 9/1989 |
| GB | 2 247 665 A1 | 3/1992 |
| JP | H06-201969 | 7/1994 |
| JP | H07-293658 | 11/1995 |
| JP | H09-120649 | 5/1997 |

OTHER PUBLICATIONS

Japanese language Office Action, with English translation, mailed Jul. 4, 2006 by the Japanese Patent Office in corresponding Japanese application No. 2003-318719, citing the three above-listed published Japanese documents.
International Search Report corresponding to European patent application No. EP 03 01 7837 completed Oct. 18, 2006 mailed by the European Patent Office on Oct. 27, 2006.

* cited by examiner

*Primary Examiner*—William C. Joyce
(74) *Attorney, Agent, or Firm*—Abelman, Frayne & Schwab

(57) ABSTRACT

A linear motion device (10) associated to a worm (14) including a body (12) internally provided with a housing seat for partially receiving a worm having a plurality of grooves, a mobile device (52) for temporary engagement in an exposed portion of at least one of the grooves (54) of the worm, and a pressure device (40) including a pneumatic piston for moving the mobile device in contact with at least one of the grooves of the worm.

13 Claims, 2 Drawing Sheets

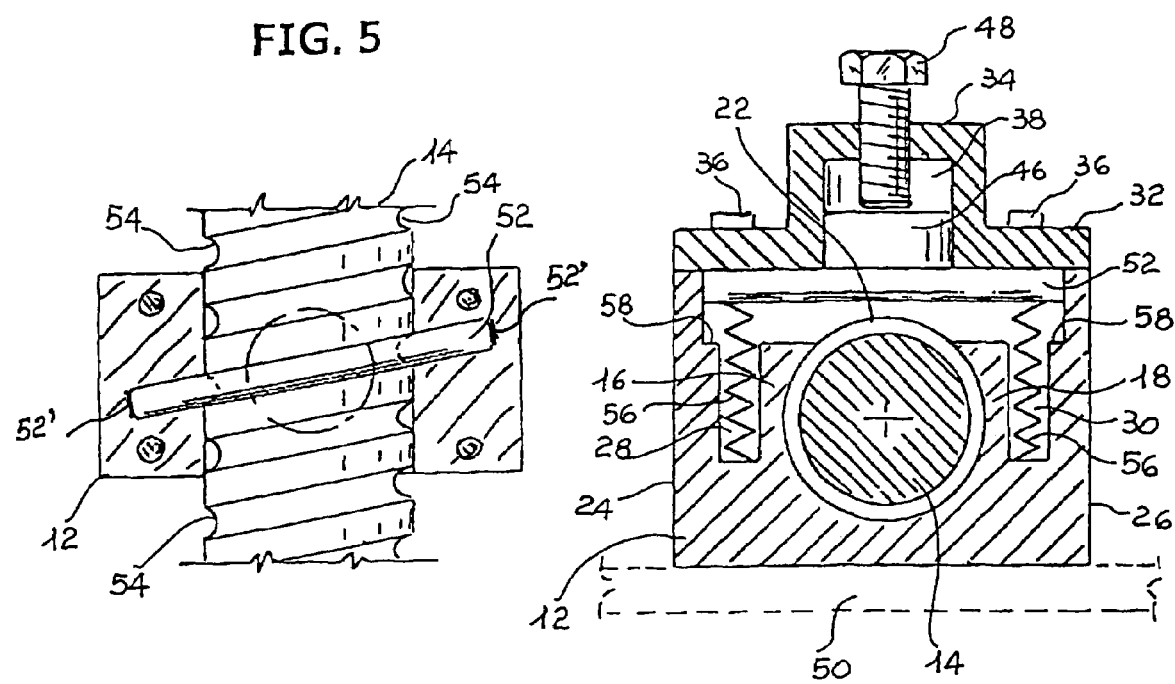
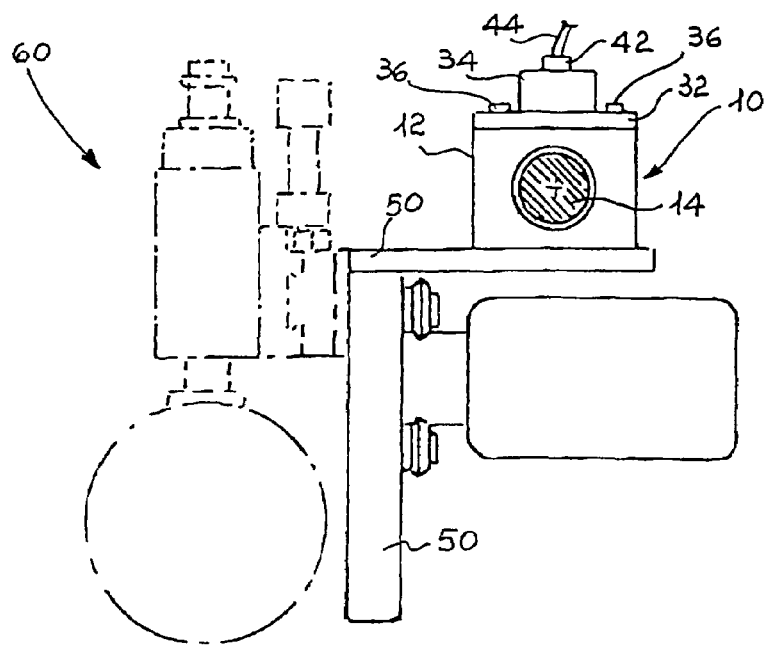

LINEAR MOTION DEVICE ASSOCIATED TO A WORM

FIELD OF THE INVENTION

The present invention refers to a linear motion device associated to a worm. More particularly, the present invention refers to a linear motion device fit to engage with a worm only when the traverse with linear or straight-line motion of mechanical components of machine tools or the like is required.

BACKGROUND OF THE DISCLOSURE

Examples of mechanical components wherein the motion device of the present invention can be applied comprise the trolleys with working tools temporarily sliding along guides. This condition can be found, for example, on machines cutting the foil material into films that require a plurality of aligned trolleys bearing blade and/or counter-blade holders. In these machines the trolleys are spaced among them in a proper and variable way in order to obtain, by continuous cutting, some strips of material having different widths.

It is known that for many machine tools of different kinds the linear motion of the equipments or the relevant supports with the working tools along guides or sliding tracks is required. This motion is usually carried out through a lead screw to which a nut is coupled, being in its turn engaged with the trolley or support to traverse.

Each of the trolleys or supports needs the presence of one nut associated to the lead screw that it is rotated by hand or by an engine. Even though this known solution is currently used, it is not free of from drawbacks.

These drawbacks are due to the fact that the equipment comprises building difficulties and implies high costs that are also connected to the periodic maintenance. The presence of a plurality of nuts associated to the lead screws, one for each trolley or supports to be moved is also cumbersome. The same nuts being constantly coupled with the lead screws can suffer from the stresses caused by the operation of the machine wherein they are applied with subsequent blacklashes due to the mechanical wears and frictions.

SUMMARY OF THE INVENTION

An object of the present invention is to remedy the above-mentioned drawbacks.

More particularly, an object of the present invention is the provision of a linear motion device associated with a worm that is easily manufactured and at low cost, and is not bulky and does not need a continuous and difficult maintenance.

A further object of the present invention is the provision of a device as defined above that temporarily engages with the lead screw, and therefore, does not suffer from possible stresses induced by the machine while applied during the operation.

A further object of the present invention is the provision of a linear motion device being able to assure a high level of resistance and reliability in time, as well as being easily manufactured.

According to the present invention, these and other purposes are achieved by the linear motion device that is associated with a worm provided with grooves and is mainly characterised in that it comprises a box-shaped body having a housing seat defined internally in the shaped body and forming a partial delimitation of said worm, a mobile device (52) which temporary engages within at least one of the grooves of the same worm, and pressure means (40) for moving the mobile device (52) in contact with at least one of the grooves (54), said pressure means comprising a pneumatic piston.

BRIEF DESCRIPTION OF THE DRAWINGS

The building and functional features of the linear motion device of the present invention can be better understood from the following description wherein reference is made to the attached tables of drawings representing a preferred embodiment which is given only by way of non-limitative example wherein:

FIG. 5 is a partial schematic view of a cross section of the same device of the previous Figures without the upper closing element;

FIG. 6 is a further schematic view of a longitudinal section of a linear motion device of the present invention according to an embodiment variant; and FIG. 7 is a front schematic view of the device of the present invention that is, for example, associated to a sliding guide to move a tool holder trolley.

DETAILED DESCRIPTION OF THE INVENTION

Figure 1:
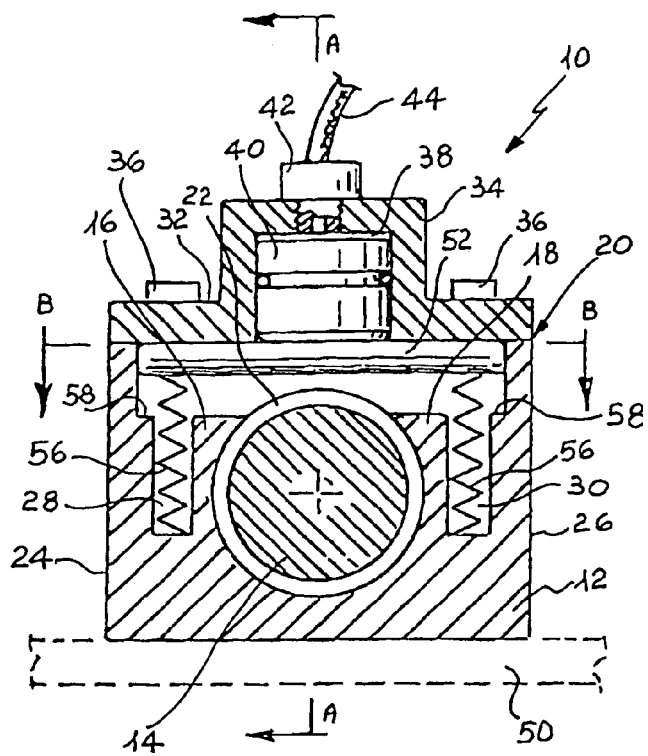
FIG. 1 is a schematic view of a longitudinal section of the linear motion device of the present invention in non-operative conditions.
Figure 2:
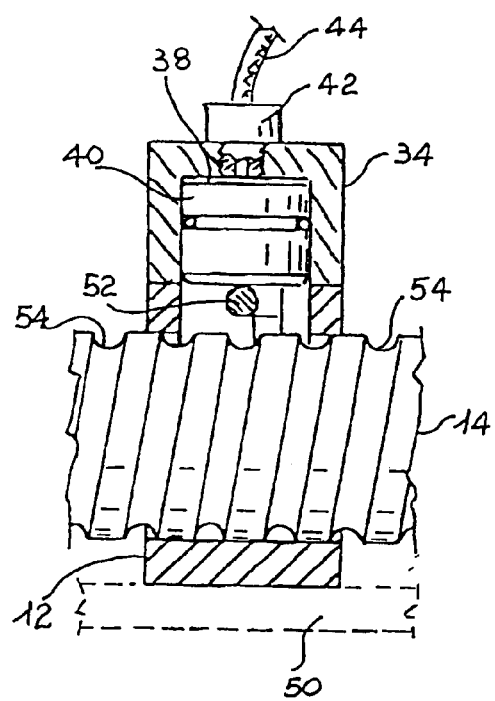
FIG. 2 is a schematic view of a section along the A-A line of the same device of FIG. 1.

With reference to FIGS. 1 and 2, the linear motion device of the present invention, marked in its whole with 10 in FIG. 1, comprises a box-shaped body 12, for example a regular prism body provided with opposite sidewalls 24, 26 and with an upper edge or mouthpiece 20. Inside the box-shaped body 12, a housing seat of a worm 14 being able to rotate with any suitable means is formed. The seat is advantageously obtained in a central position inside the body 12 wherein it is crosswise extended and delimited and in its lower part by the internal side of the base of the same body and, sideways, by opposite shoulders 16, 18.

The shoulders, 16, 18 develop in height for a limited portion while remaining remarkably spaced with their upper end from the edge or mouthpiece 20 of the box-shaped body 12. Therefore, the worm 14 is partially exposed in its part facing the mouthpiece 20 with a sector 22 that preferably corresponds to one fifth of the periphery. Between the shoulders 16, 18 and the opposite sidewalls 24, 26 of the box-shaped body 12 relevant recesses 28, 30 preferably of regular geometric shape extending in depth for a portion that it is lower than the bottom limit of the worm 14 abutted within the base of the same body are obtained. The recesses 28, 30 are fit to house elastic contrast means described here below.

A covering element or lid 32 that is centrally provided with a projection or turret 34 of any shape and size is fastened to the upper edge or mouthpiece 20. The lid 32 is integral to the body 12 with fastening means such as screws 36 or the like.

The turret 34 of the lid 32 internally defines a housing seat 38 for pressure means that are, for example, constituted by a small pneumatic piston 40 as shown in Figures from 1 to 4.

The small pneumatic piston 40 is conventionally fed through a fitting 42 and its relevant duct 44 for a working fluid. In the alternative embodiment of FIG. 6, that it is given by way of example, the pressure means is marked with 46 and it is constituted by a similar small piston that is manually moved for example by a screw 48. In both cases, the pressure means 40 or 46 bears a temporary engagement member with the worm 14 in its lower end facing the body 12 and the worm 14 in order to cause, if necessary, the linear motion of the body 12 in its whole.

For example, with reference to FIG. 7, the body 12 constitutes the traverse vehicle along the worm 14 and a support such as a trolley 50 is connected to it with known means. A working tool to cut the materials, which is shown and sketched with a dashed line in its whole with 60, or any other means requiring a linear or straight-line motion on a machine tools or equipment is coupled with the trolley 50.

Referring now to FIGS. 1-5, the member engaging with the worm 14 is advantageously constituted by at least one rod or pin 52 that extends crosswise in the body 12 according to a direction that is parallel to the grooves of the worm 14 marked with 54. The rod 52 is fit into opposite guiding slots 52' (FIG. 5) obtained on the internal face of the sidewalls 24, 26 of the body 12. The crosswise extension of the rod or pin 52 is preferably slightly lower that the whole width of the body 12 and it is higher than the maximum distance existing between the recesses 28, 30. The profile of the rod or pin 52 is complementary to the one of the grooves 54 of the worm 14.

With an appropriate dimensioning, the pressure means 40 or 46 can bear two or more parallel rods or pins 52 fit to match with as many grooves 54 of the worm 14 as described here below.

In recesses 28, 30, for example, contrast elastic means of the rod or pin 52 are constituted by helical springs 56.

The springs 56 keep the rod or pin 52 separated from the grooves of the worm 14, i.e. it is driven upwards towards the lid 32 forming the rebating plane for the same rod. The internal surface of the sidewalls 24, 26 of the body 12 defines, together with the mouthpiece of the recesses 28 and 30, a step 58 that is substantially aligned to the grooves 54 of the worm 14 in its part protruding from the shoulders 16, 18. The step 58 can form a stop rebate of the rod or pin 52 of the vertical excursion towards the same worm 14.

As it can be noticed from the above description, the operation of the motion device 10 temporarily engages the body 12 and the support 50 connected to it by the worm 14 with the subsequent required linear traverse or motion. FIGS. 1, 2 and 6 schematically show in detail the device 10 of the present invention in a non-operating condition as the rod or pin 52 is moved upwards due to the effect of the elastic means 56 with respect to the grooves 54 of the worm 14.

Figure 3:
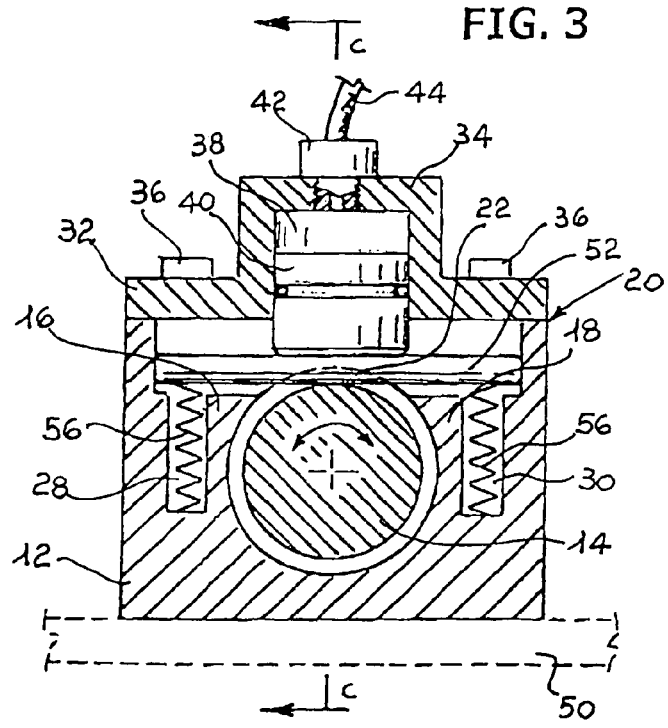
FIG. 3 is a schematic view of a longitudinal section of the linear motion device of the present invention in operation.
Figure 4:
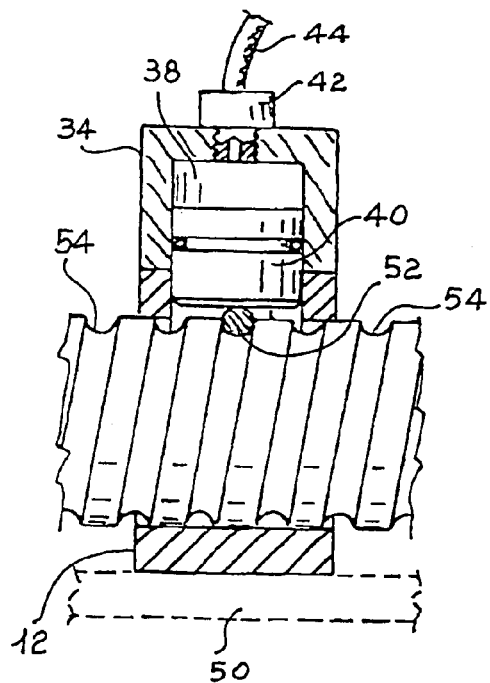
FIG. 4 is a schematic view of a section along the C-C line of the device of FIG. 3.

Therefore, the possible rotation of the latter in the body or bodies 12 does not cause their traverse or linear motion effects as the rod or pin 52 is not engaged with one or the other groove 54. FIGS. 3 and 4 schematically show the device 10 in operation, its rod or pin 52 is abutted into one of the grooves 54 of the worm 14. This condition occurs after the pneumatic or hand operation of the pressure means 40 or 46 by which the rod or pin 52 lowers towards the body 12 and centrally matches with one of the grooves 54 of the worm 14. The clockwise or anti-clockwise rotation of the worm 14, in this case, causes the traverse or linear motion of the body 12 and of all means fastened to it, i.e. of the support or trolley 50 with the relevant tool 60 or of any other kind of tool. On the contrary, once the required positioning of the body/bodies 12 is obtained, the rod or pin 52 is disengaged from the groove 54 of the worm 14 and this result is obtained removing the fluid pressure on the pressure means 40 or the mechanical one on the pressure means 46 intervening on the screw 48.

As it can be noticed from the above-mentioned description, the advantages obtained by the invention are clear.

The linear motion device of the present invention can be easily manufactured and installed at low costs and it does not require particular maintenance.

The opportunity of temporarily engaging, if necessary, the device/devices, 10 with the worm 14 is particularly advantageous.

Even though the invention has been described with reference to some embodiments given as an illustrative and non-limitative example, many changes and variations can be carried out by a person skilled in the art according to the above-mentioned description. It is therefore understood that the present invention is meant to comprise all changes and variations falling within the spirit and the protective scope of the following claims.

I claim:

1. A linear motion device (10) including a worm (14) provided with grooves (54), comprising:
    a box-shaped body (12);
    a housing seat defined internally in the shaped body and forming a partial delimitation of said worm (14);
    a mobile device (52) which temporarily engages with at least one of the grooves (54) of the worm; and
    pressure means (40) for moving the mobile device (52) in contact with at least one of the grooves (54), said pressure means comprising a pneumatic pistons wherein the box-shaped body (12) comprises:
        opposite sidewalls (24, 26) and an upper edge or mouthpiece (20) and the housing seat and partial delimitation of the worm (14) is obtained in the central part of the body (12), said worm being crosswise extended and having a lower part delimited by an internal face of the base of the same body, and side portions of said worm (14) being delimited by opposite shoulders (16, 18) developing in height for a limited portion, such that opposing upper ends of said opposite shoulders are spaced a distance from the mouthpiece or edge (20) of said body (12); and
    the mobile means (52) include at least one rod or pin associated with said pressure means (40) and extending crosswise inside the box-shaped body (12) and parallel to said grooves (54) and inserted in opposite guiding slots (52') obtained on the internal face of the sidewalls (24, 26) of the body (12).

2. The device according to claim 1 wherein the worm is exposed at a sector (22) facing said upper edge or mouthpiece (20) of the body (12).

3. The device according to claim 2 further comprising a lid (32) having a turret (34) fastened over the upper edge or mouthpiece (20) of the body (12), wherein said turret (34) forms a second seat (38) for facilitating said pressure means (40).

4. The device according to claim 3, wherein said pressure means (40) further comprises a fitting (42) and a duct (44) for providing working fluid to the pneumatic piston.

5. The device according to claim 2 wherein said sector (22) includes a dimension of approximately one fifth of the periphery of the worm (14).

6. The device according to claim 1 characterised in that the mobile means are constituted by two or more parallel rods or pins (52) associated to the pressure means (40, 46) matching with as many grooves (54) of the worm (14).

7. A linear motion device (10), comprising:
- a worm (14) provided with grooves (54);
- box-shaped body (12) having a housing seat defined internally in the shaped body and forming a partial delimitation of said worm (14), wherein the box-shaped body (12) comprises opposite sidewalls (24, 26) and an upper edge or mouthpiece (20);
- a mobile device (52) which temporarily engages with at least one of the grooves (54) of the same worm; and
- pressure means (40) for moving the mobile device (52) in contact with the at least one of the grooves (54), said pressure means comprising a pneumatic piston, wherein the mobile means (52) include at least one rod or pin adapted to interface with said pressure means (40), said mobile device (52) extending crosswise inside the box-shaped body (12) and parallel to said grooves (54) and inserted in opposite guiding slots (52') formed along an internal face of the sidewalls (24, 26) of the body (12).

8. The device according to claim 7 wherein the worm is exposed at a sector (22) facing said upper edge or mouthpiece (20) of the body (12).

9. The device according to claim 8 wherein said sector (22) includes a dimension of approximately one fifth of the periphery of the worm (14).

10. The device according to claim 7 further comprising a lid (32) over said upper edge or mouthpiece (20), said lid having an elongated turret (34) wherein a second seat (38) for said pressure means (40) is formed.

11. The device according to claim 7, wherein the housing seat includes opposing shoulders (16, 18) that partially delimitate said worm (14), said shoulders and the sidewalls (24, 26) of the body (12) forming recesses (28, 30) therebetween for facilitating contrast elastic means (56) that interface with the rod or pin (52).

12. The device according to claim 11 characterized in that the internal surface of the sidewalls (24, 26) of the body (12) each include a rebate step (58) for terminating the rod or pin (52) movement towards the worm (14).

13. The device according to claim 7 characterized in that the profile of said rod or pin (52) is complementary to the grooves (54) of the worm (14).

\* \* \* \* \*